United States Patent
Zhang et al.

(10) Patent No.: US 9,992,494 B2
(45) Date of Patent: Jun. 5, 2018

(54) METHOD OF DEPTH BASED BLOCK PARTITIONING

(71) Applicant: HFI INNOVATION INC., Zhubei, Hsinchu County (TW)

(72) Inventors: Xianguo Zhang, Beijing (CN); Kai Zhang, Beijing (CN); Jicheng An, Beijing (CN); Han Huang, Beijing (CN); Jian-Liang Lin, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 622 days.

(21) Appl. No.: 14/583,628

(22) Filed: Dec. 27, 2014

(65) Prior Publication Data
US 2015/0237324 A1    Aug. 20, 2015

Related U.S. Application Data

(63) Continuation-in-part of application No. PCT/CN2014/072194, filed on Feb. 18, 2014.

(51) Int. Cl.
*H04N 19/119* (2014.01)
*H04N 19/597* (2014.01)
(Continued)

(52) U.S. Cl.
CPC ....... *H04N 19/119* (2014.11); *H04N 13/0007* (2013.01); *H04N 13/0037* (2013.01);
(Continued)

(58) Field of Classification Search
None
See application file for complete search history.

(56) References Cited

U.S. PATENT DOCUMENTS

| 9,485,503 | B2 * | 11/2016 | Zhang | H04N 19/00 |
| 2012/0200669 | A1 * | 8/2012 | Lai | G06T 5/002 |
| | | | | 348/43 |

(Continued)

FOREIGN PATENT DOCUMENTS

WO    WO 2015007348 A1 *  1/2015  ........... H04N 19/597

*Primary Examiner* — Dave Czekaj
*Assistant Examiner* — Tyler W Sullivan
(74) *Attorney, Agent, or Firm* — McClure, Qualey & Rodack, LLP

(57) ABSTRACT

A method of simplified depth-based block partitioning (DBBP) for three-dimensional and multi-view video coding is disclosed. In one embodiment, the derivation of a representative value of a corresponding depth block or a reference texture block in a reference view for generating a segmentation mask and selecting a block partition are unified. In another embodiment, the first representative value, the second representative value, or both are calculated from partial samples of the corresponding depth block or the reference texture block. In yet another embodiment, a first representative value for first samples in a first partitioned block of the corresponding depth block or the reference texture block, and a second representative value for second samples in a second partitioned block of the corresponding depth block or the reference texture block for each of block partition candidates are determined.

21 Claims, 6 Drawing Sheets

(51) Int. Cl.
*H04N 19/176* (2014.01)
*H04N 19/46* (2014.01)
*H04N 19/136* (2014.01)
*H04N 13/00* (2018.01)

(52) U.S. Cl.
CPC ......... *H04N 19/136* (2014.11); *H04N 19/176* (2014.11); *H04N 19/46* (2014.11); *H04N 19/597* (2014.11); *H04N 13/0048* (2013.01)

(56) References Cited

U.S. PATENT DOCUMENTS

| | | | |
|---|---|---|---|
| 2014/0153645 A1* | 6/2014 | Zhang | H04N 19/597 375/240.12 |
| 2014/0247867 A1* | 9/2014 | Merkle | H04N 19/00096 375/240.03 |
| 2015/0172717 A1* | 6/2015 | Zhao | H04N 19/597 375/240.16 |
| 2015/0365699 A1* | 12/2015 | Lin | H04N 19/597 375/240.12 |
| 2016/0212446 A1* | 7/2016 | Liu | H04N 19/597 |

\* cited by examiner

METHOD OF DEPTH BASED BLOCK PARTITIONING

CROSS REFERENCE TO RELATED APPLICATIONS

The present invention is a continuation-in-part of and claims priority to PCT Patent Application, Serial No. PCT/CN2014/072194, filed on Feb. 18, 2014, entitled "Methods for Depth-based Block Partitioning". The PCT Patent Application is hereby incorporated by reference in its entirety.

FIELD OF THE INVENTION

The present invention relates to three-dimensional (3D) and multi-view video coding. In particular, the present invention relates to texture coding utilizing depth-based block partitioning (DBBP) to improve coding efficiency.

BACKGROUND AND RELATED ART

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the 3D video is capable of offering arbitrary viewpoints of dynamic scenes and provides viewers the sensation of realism.

The 3D video is typically created by capturing a scene using video camera with an associated device to capture depth information or using multiple cameras simultaneously, where the multiple cameras are properly located so that each camera captures the scene from one viewpoint. The texture data and the depth data corresponding to a scene usually exhibit substantial correlation. Therefore, the depth information can be used to improve coding efficiency or reduce processing complexity for texture data, and vice versa. For example, the corresponding depth block of a texture block reveals similar information corresponding to the pixel level object segmentation. Therefore, the depth information can help to realize pixel-level segment-based motion compensation. Accordingly, a depth-based block partitioning (DBBP) has been adopted for texture video coding in the current 3D-HEVC (3D video coding based on the High Efficiency Video Coding (HEVC) standard).

The current depth-based block partitioning (DBBP) comprises steps of virtual depth derivation, block segmentation, block partition, and bi-segment compensation. First, virtual depth is derived for the current texture block using a disparity vector from neighboring blocks (NBDV). The derived disparity vector (DV) is used to locate a depth block in a reference view from the location of the current texture block. The reference view may be a base view. The located depth block in the reference view is then used as a virtual depth block for coding the current texture block. The virtual depth block is to derive block segmentation for the collocated texture block, where the block segmentation can be non-rectangular. A mean value, of the virtual depth block is determined. A binary segmentation mask is generated for each pixel of the block by comparing the virtual depth value with the mean value, d. The mean value is utilized to compare with each virtual depth value to generate the mask values. If the left-up corner virtual depth value is larger than the mean value, all segmentation mask values corresponding to the depth values larger than d are 0; and all the segmentation mask values corresponding to the depth values less than d are 1. FIGS. 1A-B illustrates an example of block segmentation based on the virtual block. In FIG. 1A, corresponding depth block 120 in a reference view for current texture block 110 in a dependent view is located based on the location of the current texture block and derived DV 112, which is derived using NBDV according to 3D-HEVC. The mean value of the virtual block is determined in step 140. The values of virtual depth samples are compared to the mean depth value in step 150 to generate segmentation mask 160. The segmentation mask is represented in binary data to indicate whether an underlying pixel belongs to segment 1 or segment 2, as indicated by two different line patterns in FIG. 1B.

In order to avoid high computational complexity associated with pixel-based motion compensation, DBBP uses block-based motion compensation. Each texture block may use one of 6 non-square partitions consisting of 2N×N, N×2N, 2N×nU, 2N×nD, nL×2N and nR×2N, where the latter four block partitions correspond to AMP (asymmetric motion partition). After a block partition is selected from these block-partition candidates by block partition selection process, two predictive motion vectors (PMVs) are derived for the partitioned blocks respectively. The PMVs are then utilized for compensating the to-be-divided two segments. According to the current 3D-HEVC, the best block partition is selected by comparing the segmentation mask and the negation of the segmentation mask (i.e., the inverted segmentation mask) with the 6 non-square partition candidates (i.e., 2N×N, N×2N, 2N×nU, 2N×nD, nL×2N and nR×2N). The pixel-by-pixel comparison counts the number of so-called matched pixels between the segmentation masks and the block partition patterns. There are 12 sets of matched pixels need to be counted, which correspond to the combinations of 2 complementary segmentation masks and 6 block partition types. The block partition process selects the candidate having the largest number of matched pixels. FIG. 2 illustrates an example of block partition selection process. In FIG. 2, the 6 non-square block partition types are superposed on top of the segmentation mask and the corresponding inverted segmentation mask. A best matching partition between a block partition type and a segmentation mask is selected as the block partition for the DBBP process.

After a block partition type is selected, two predictive motion vectors can be determined. Each of the two predictive motion vectors is applied to the whole block to form a corresponding prediction block. The two prediction blocks are then merged into one on a pixel by pixel basis according to the segmentation mask and this process is referred as bi-segment compensation. FIG. 3 illustrates an example of DBBP process. In this example, the N×2N block partition type is selected and two corresponding motion vectors (MV1 and MV2) are derived for two partitioned blocks respectively. Each of the motion vectors is used to compensate a whole texture block (310). Accordingly, motion vector MV1 is applied to texture block 320 to generate prediction block 330 according to motion vector MV1, and motion vector MV2 is applied to texture block 320 also to generate prediction block 332 according to motion vector MV2. The two prediction blocks are merged by applying respective segmentation masks (340 and 342) to generate the final prediction block (350).

While the DBBP process reduces computational complexity by avoiding pixel-by-pixel based motion compensation, problems still exist in the steps of block partition and block segmentation. One issue is associated with the mean value calculation for block partition and block segmentation. The steps utilize different mean value calculations for block partition and block segment. For block partition, the mean value is determined based on the average of all the upper-left corner pixels of the 4×4 sub-blocks in the corresponding depth block. On the other hand, for block segmentation, the mean value is determined according to the average of all pixels of the corresponding depth block. The two different mean value calculations in DBBP will inevitably increase the encoding and decoding complexity. Another issue is associated with the high computational complexity involved in the block partition processing. However, this step is only utilized to derive suitable motion vectors from more reliable block partitioning. The block partition type doesn't play any role in generating the final prediction block after the motion vectors are derived as evidenced in FIG. 3. A further issue associated with the block partitioning is the large number of partition types due to the use of AMP. The current practice determines whether to utilize AMP partitions directly based on the CU size. The use of AMP may not necessarily provide noticeable improvement in system performance. Therefore, it is desirable to develop means to overcome these issues mentioned here.

BRIEF SUMMARY OF THE INVENTION

A method of simplified depth-based block partitioning (DBBP) for three-dimensional and multi-view video coding is disclosed. In one embodiment, the derivation of a representative value of a corresponding depth block or a reference texture block in a reference view for generating a segmentation mask and selecting a block partition are unified. This unified representative value derivation can reduce the required computations compared to the conventional DBBP coding. The unified representative value may correspond to the mean, the average or the sum of all samples or partial samples of the corresponding depth block or the reference texture block. Said deriving the unified representative value can be performed during said generating the current segmentation mask and information regarding the unified representative value is then provided to said selecting the current block partition, or vice versa.

Selecting the current block partition may comprise comparing selected samples at multiple fixed positions in the corresponding depth block or the reference texture block. The multiple fixed positions may correspond to upper-left, upper-right, lower-left and lower-right corner samples of the corresponding depth block or the reference texture block. The multiple fixed positions may also correspond to upper-left, upper-right, lower-left and lower-right corner samples of each partitioned block of each block partition candidate corresponding to the corresponding depth block or the reference texture block. The unified representative value may also be calculated as an average of selected samples corresponding to sub-sampled positions of the corresponding depth block or the reference texture block. In this case, the unified representative value is calculated for each partitioned block of each block partition candidate corresponding to the corresponding depth block or the reference texture block. The unified representative value may also be calculated from an average of all samples in the corresponding depth block or the reference texture block. Selecting the current block partition from block partition candidates may also comprise determining absolute difference between a first sum of first samples of a first partitioned block and a second sum of second samples of a second partitioned block for each block partition candidate, and selecting the block partition candidate having a largest absolute difference as the current block partition.

One or more flags in a video bitstream may be used to indicate available block partition candidates used for selecting the current block partition. Furthermore, another one or more flags may be used to indicate the block partition candidate selected as the current block partition. One or more flags in the video bitstream may also be used to indicate a partition direction of the block partition candidate selected as the current block partition. The block partition candidates may exclude AMP (asymmetric motion partitions) when AMP is not available for a current picture, current slice or current coding unit containing the current block.

In another embodiment, the first representative value, the second representative value, or both are calculated from partial samples of the corresponding depth block or the reference texture block. The partial samples may correspond to four corner samples of the corresponding depth block or the reference texture block, and the current texture block corresponds to a CTU (coding tree unit), a CTB (coding tree block), a CU (coding unit), or a PU (prediction unit).

In yet another embodiment, the first representative value is determined from four corner samples of the corresponding depth block or the reference texture block and the second representative value is determined for each partitioned block of a block partition candidate corresponding to the corresponding depth block or the reference texture block based on four corner samples of each partitioned block.

In yet another embodiment, a first representative value for first samples in a first partitioned block of the corresponding depth block or the reference texture block, and a second representative value for second samples in a second partitioned block of the corresponding depth block or the reference texture block for each of block partition candidates are determined. The current block partition is selected based on one of the block partition candidates that has a largest absolute difference between the first representative value and the second representative value.

DETAILED DESCRIPTION OF THE INVENTION

In order to overcome the computational complexity issues associated with existing depth-based block partitioning (DBBP) process, the present invention discloses various embodiments to reduce the complexity.

In one embodiment, the mean value calculations for selecting a block partition and generating a segmentation mask for DBBP are unified. In other words, the same mean value calculation is used for both the block partition process and the block segmentation process.

According to this embodiment, the block segmentation utilizes an input parameter provided from the block partition process. This input parameter can be the averaged value from all depth samples in the corresponding depth block, the averaged value of all upper-left corner pixels of k×k sub-blocks of the corresponding depth block, where k is an integer such as k=4 is. Other means to derive the mean value may also be used. For example, the upper-left corner pixels can be replaced by the upper-right, lower-left, or lower-right pixels. Since information associated with the mean value is provided from the block partition process, there is no need for the block segmentation process to calculate the mean value again. Alternatively, the information associated with the mean value can be determined by the block segmentation process and provided to the block partition process.

The mean value for the corresponding depth block or a partitioned block of the corresponding depth block may be determined from the average of all upper-left corner pixels of k×k sub-blocks of the corresponding depth block. In this case, the mean value derived using sub-sampled data represents an approximation to the actual mean of the corresponding depth block. For generality, the value derived for each block or partitioned block for block partition or block segmentation is referred as a "representative value" in this disclosure. Furthermore, the representative value of a block or partitioned block for block partition or block segmentation does not have to be the averaged value of selected samples. The representative value may correspond to a mean, an average or a sum of all samples or partial samples of the corresponding depth block according to the present invention.

Figure 1A:
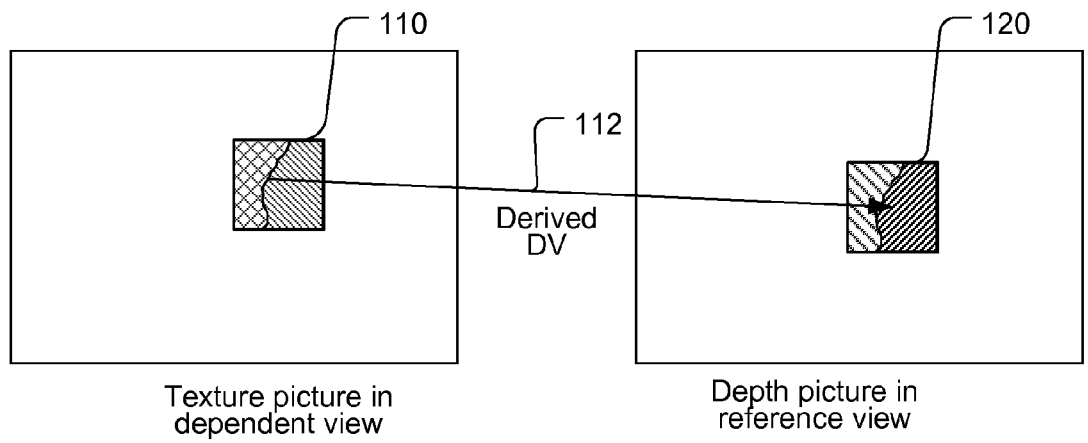
FIG. 1A illustrates an exemplary derivation process to derive a corresponding depth block in a reference view for a current texture block in a dependent view.
Figure 1B:
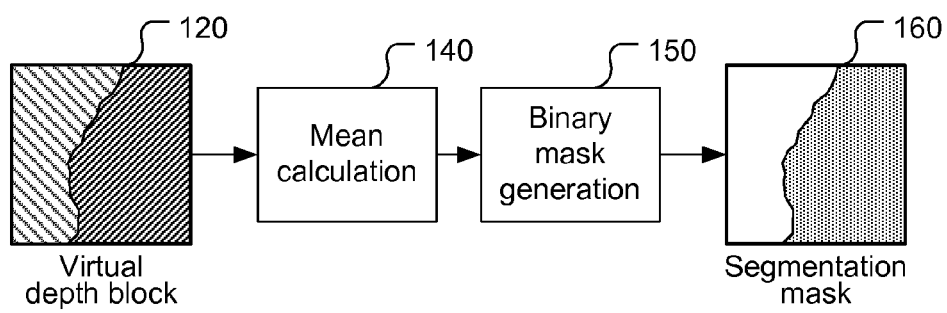
FIG. 1B illustrates an exemplary derivation process to generate the segmentation mask based on the corresponding depth block in a reference view for a current texture block in a dependent view.
Figure 2:
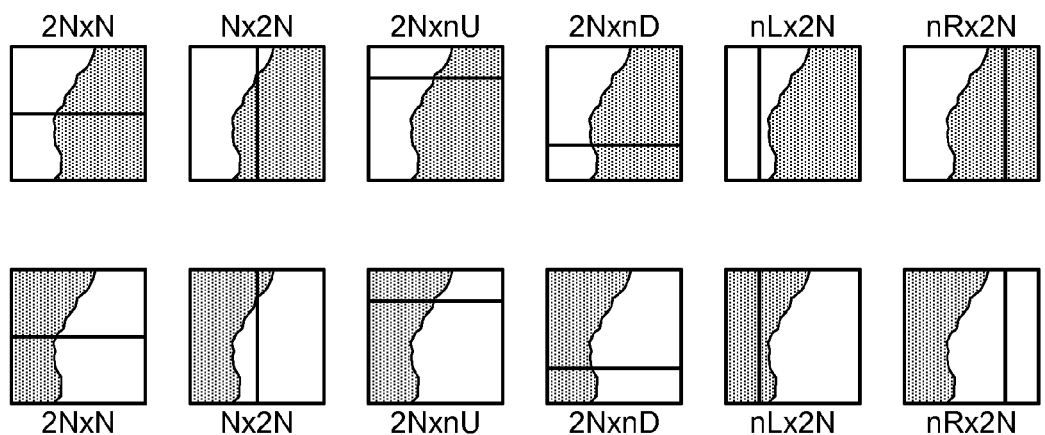
FIG. 2 illustrates an example of 12 possible combinations of block partition types and segmentation mask/inverted segmentation mask for block partition selection.
Figure 3:
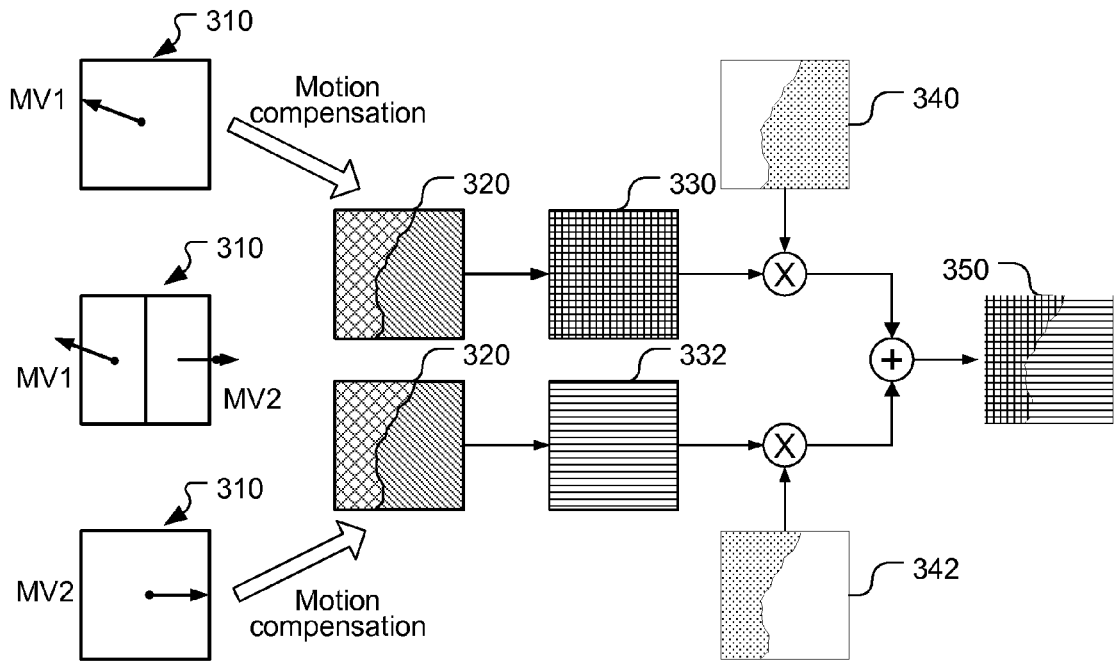
FIG. 3 illustrates an exemplary processing flow for 3D or multi-view coding using depth-based block partitioning (DBBP).
Figure 4:
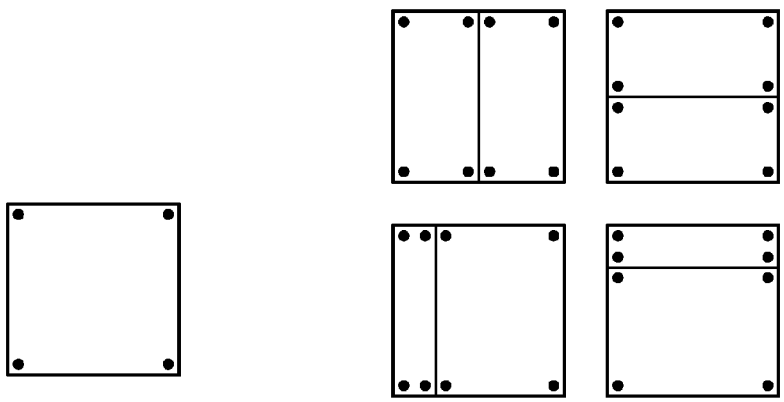
FIG. 4 illustrates an example of representative value derivation based on four corner samples of the corresponding depth block in a reference view.
Figure 5:
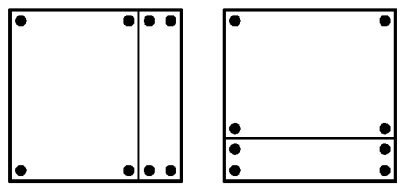
FIG. 5 illustrates an example of representative value derivation for each partitioned block of a block partition candidate based on four corner samples of the partitioned block.

In another embodiment, the complexity associated with the mean value calculation is substantially reduced by deriving the representative value based on a small set of depth sample locations (i.e., partial samples of a block). For example, instead of using all depth samples or the upper-left corner samples of k×k sub-blocks in the derived depth block, only four corner samples of respective block are used for determining the representative value. For example, during the block segmentation process, the mean value of the derived depth block corresponding to a coding unit (CU) has to be calculated. The partial samples may correspond to four corner samples of the corresponding depth block as shown in FIG. 4. The current texture block may correspond to a CTU (coding tree unit), a CTB (coding tree block), a CU (coding unit), or a PU (prediction unit), where CTU, CTB, PU and CU are various picture data structure as described in the High Efficiency Video Coding (HEVC) standard. For block partition process, the representative value of each respective partitioned block (i.e., a prediction unit (PU)) of a block partition candidate can also be derived based on 4 corner samples of the respective PU as shown in FIG. 5.

In another embodiment, the complexity associated with block partitioning is substantially reduced by comparing pixels at pre-defined locations of the corresponding depth block for each partition candidate. According to this embodiment, the block partition process is simplified by comparing the relationships among the pixels at pre-defined locations of the corresponding depth block for each block partition candidate. According to this embodiment, m pixels at pre-defined locations of the derived depth block for each partitioned block of a block partition candidate are used to determine the desired block partition. For example, m can be set to be equal to 4 and the positions of the 4 pixels correspond to the 4 corner locations of each partitioned block of a block partition candidate associated with the corresponding depth block, as shown in FIG. 5. For a block partition candidate p, let $S1_p$ and $S2_p$ be the sums of the 4 corner pixels in the first and the second partitioned blocks, $M_p$ be the absolute difference between $S1_p$ and $S2_p$. According to an embodiment of the present invention, the block partition is selected according to the block partition candidate p having the largest absolute difference, $M_p$. While the sums, $S1_p$ and $S2_p$ are used as "representative values" for individual partition blocks, other representative values may also be used. For example, the average of the 4 corner samples can be used, which will result in the same block partition decision as the sum.

The inclusion of AMP in the block partition candidates will cause increased complexity for block partition decision. In yet another embodiment of the present invention, AMP partitions are included as candidates only if the current CU size is larger than 8×8 and AMP partitions is enabled for the current CU. Furthermore, different block partition candidates may be used. In this case, one or more syntax elements (e.g., flags) may be signaled in the bitstream to indicate the available block partition candidates. In order for a decoder to recover the block partition selected at the encoder end, one or more syntax elements (e.g., flags) may be signaled in the bitstream to indicate the block partition selected. (modify flag in spec)

While the derived depth block is used to generate a segmentation mask, a reference texture block in a reference view may also be used for DBBP. In this case, the reference texture block in a reference view is located and used for the DBBP process as if it were a corresponding depth block. In this case, the representative value is derived based on the reference texture block. The segmentation mask is derived based on the reference texture block. The embodiments disclosed above using the corresponding depth block in a reference view are applicable to the case using the reference texture block in a reference view.

Figure 6:
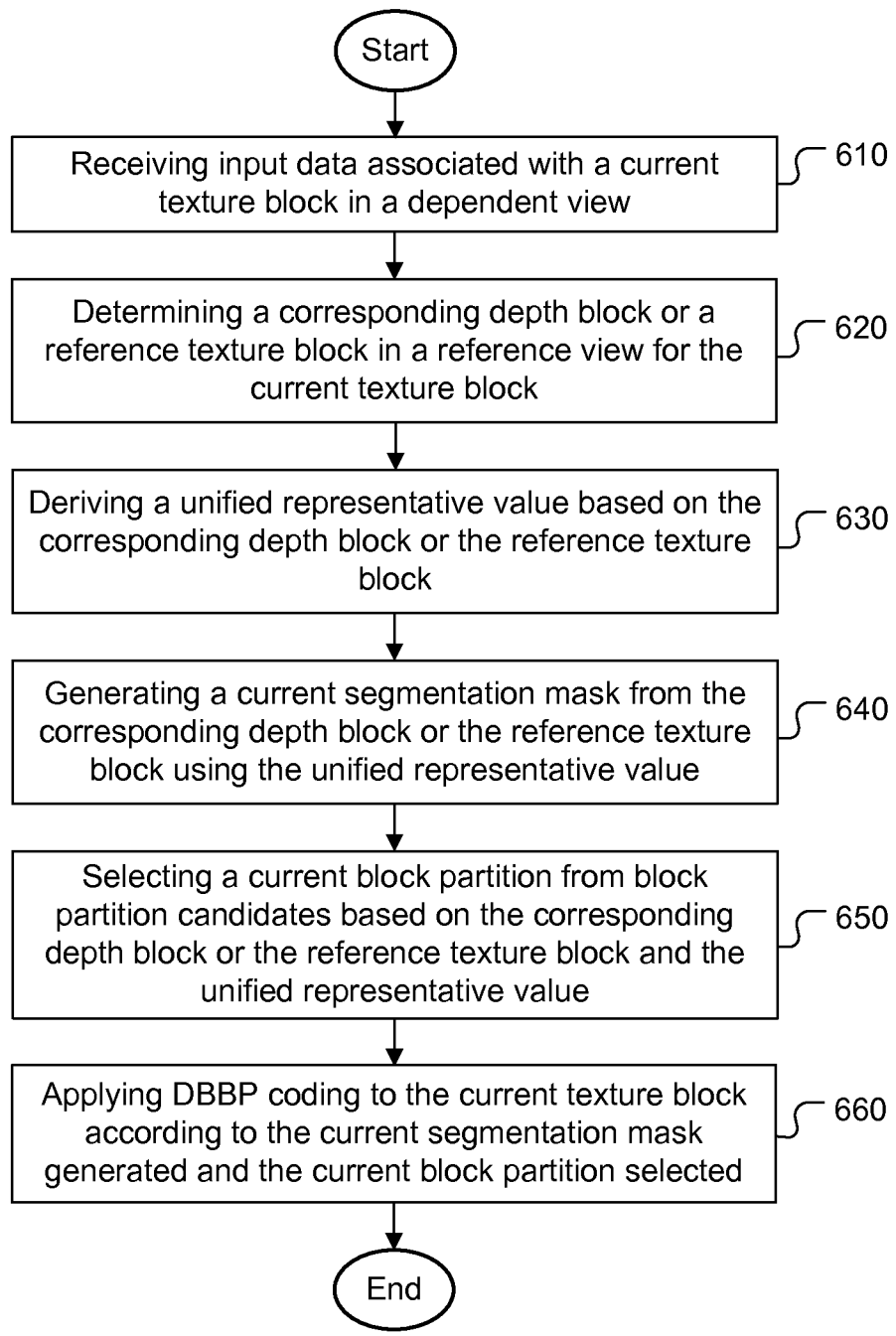
FIG. 6 illustrates a flowchart of an exemplary system incorporating an embodiment of the present invention to simplify depth-based block partitioning (DBBP), where the representative value of the corresponding depth block or the reference texture block is unified for generating a segmentation mask and selecting a block partition for DBBP.

FIG. 6 illustrates a flowchart of an exemplary system incorporating an embodiment of the present invention to simplify depth-based block partitioning (DBBP), where the representative value of the corresponding depth block or the reference texture block is unified. The system receives input data associated with a current block in a dependent view as shown in step 610. For encoding, the input data corresponds to pixel data to be encoded. For decoding, the input data corresponds to coded pixel data to be decoded. The input data may be retrieved from memory (e.g., computer memory, buffer (RAM or DRAM) or other media) or from a processor. A corresponding depth block or a reference texture block in a reference view for the current texture block is determined in step 620. A unified representative value is derived based on the corresponding depth block or the reference texture block in step 630. A current segmentation mask is generated from the corresponding depth block or the reference texture block using the unified representative value in step 640. A current block partition is selected from block partition candidates based on the corresponding depth block or the reference texture block and the unified representative value in step 650. DBBP coding is then applied to the current texture block according to the current segmentation mask generated and the current block partition selected in step 660.

Figure 7:
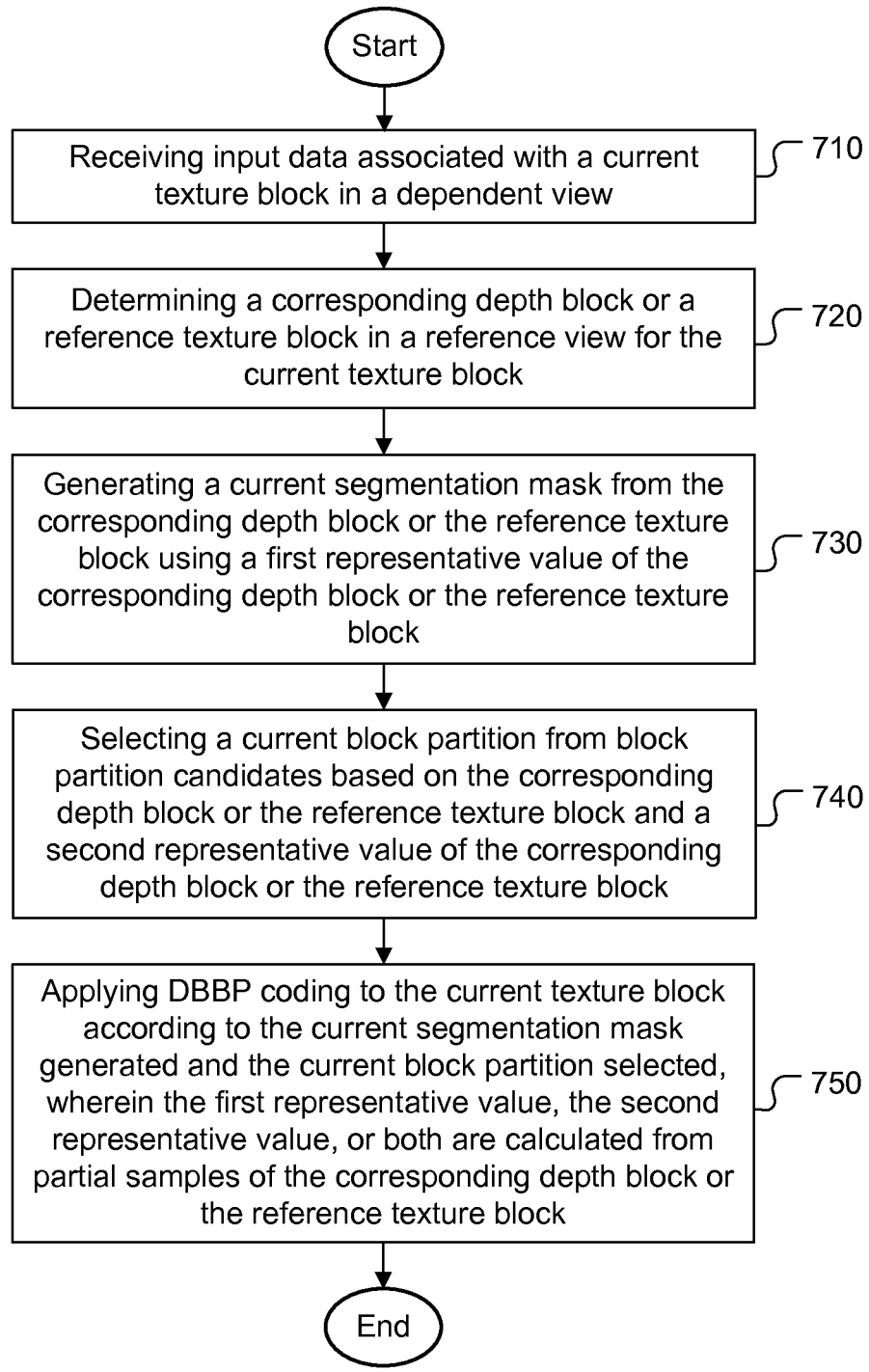
FIG. 7 illustrates a flowchart of an exemplary system incorporating an embodiment of the present invention to simplify depth-based block partitioning (DBBP), where the representative value derivation is based on partial samples for generating the segmentation mask, selecting a block partition or both.

FIG. 7 illustrates a flowchart of an exemplary system incorporating an embodiment of the present invention to simplify depth-based block partitioning (DBBP), where the representative value derivation is based on four corner samples for generating the segmentation, selecting a block partition or both. The system receives input data associated with a current block in a dependent view as shown in step 710. A corresponding depth block or a reference texture block in a reference view for the current texture block is determined in step 720. A current segmentation mask is generated from the corresponding depth block or the reference texture block using a first representative value of the corresponding depth block or the reference texture block in step 730. A current block partition is selected from block partition candidates based on the corresponding depth block or the reference texture block and a second representative value of the corresponding depth block or the reference texture block in step 740. DBBP coding is then applied to the current texture block according to the current segmentation mask generated and the current block partition selected in step 750, where the first representative value, the second representative value, or both are calculated from partial samples of the corresponding depth block or the reference texture block.

Figure 8:
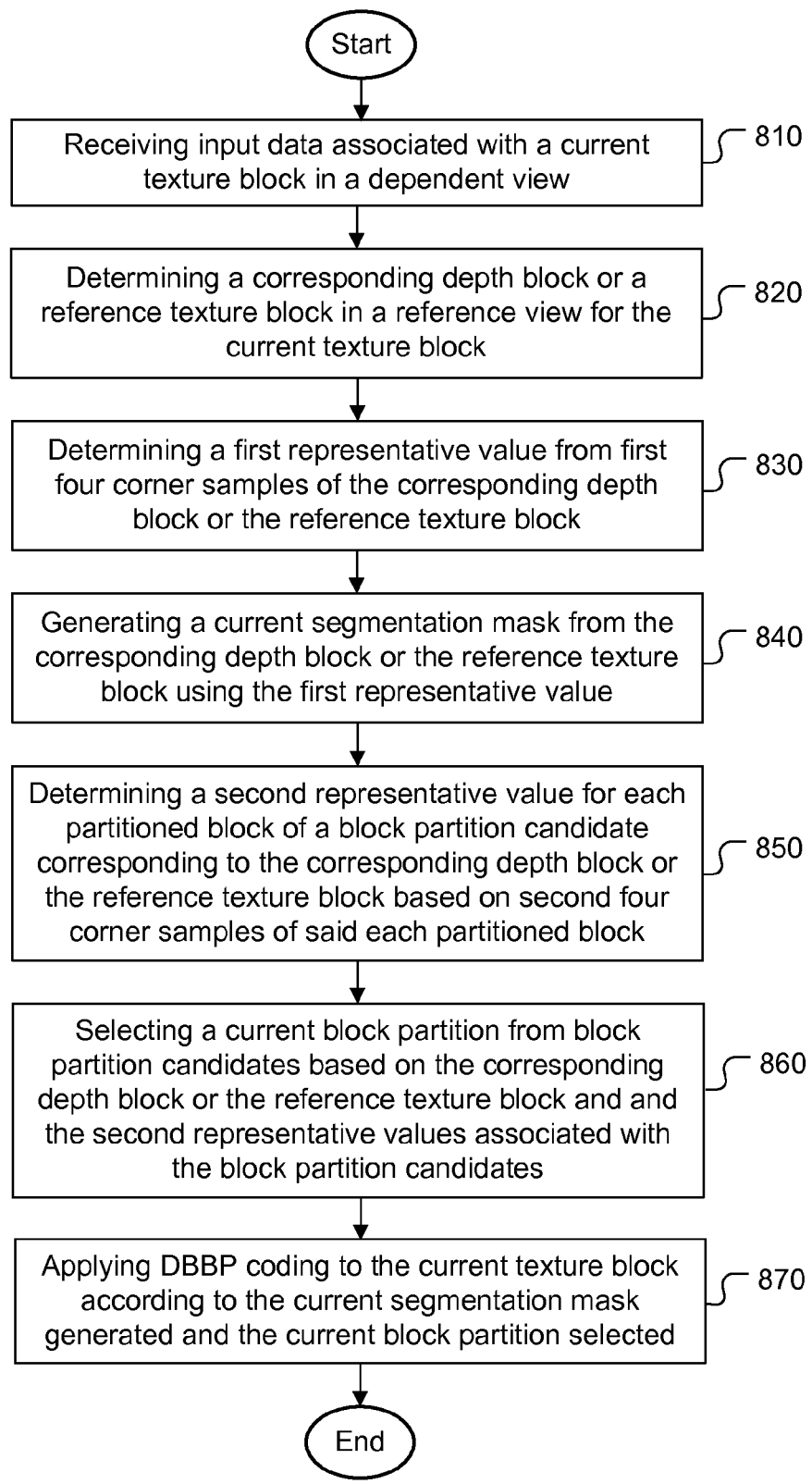
FIG. 8 illustrates a flowchart of an exemplary system incorporating an embodiment of the present invention to simplify depth-based block partitioning (DBBP), where the representative value for generating a segmentation mask is based on four corner samples of the corresponding depth block or the reference texture block, and the representative value for selecting a block partition is derived based on four corner samples of respective partitioned blocks of a block partition candidate.

FIG. 8 illustrates a flowchart of an exemplary system incorporating an embodiment of the present invention to simplify depth-based block partitioning (DBBP), where the representative value for generating block segmentation mask is based on four corner samples of the corresponding depth block or the reference texture block, and the representative value for selecting the block partition is derived based on four corner samples of respective partitioned blocks of a block partition candidate. The system receives input data associated with a current block in a dependent view as shown in step 810. A corresponding depth block or a reference texture block in a reference view for the current texture block is determined in step 820. A first representative value is determined from first four corner samples of the corresponding depth block or the reference texture block in step 830. A current segmentation mask is generated from the corresponding depth block or the reference texture block using the first representative value in step 840. A second representative value for each partitioned block of a block partition candidate corresponding to the corresponding depth block or the reference texture block is determined based on second four corner samples of said each partitioned block in step 850. A current block partition is selected from block partition candidates based on the corresponding depth block or the reference texture block and the second representative values associated with the block partition candidates in step 860. DBBP coding is then applied to the current texture block according to the current segmentation mask generated and the current block partition selected in step 870.

Figure 9:
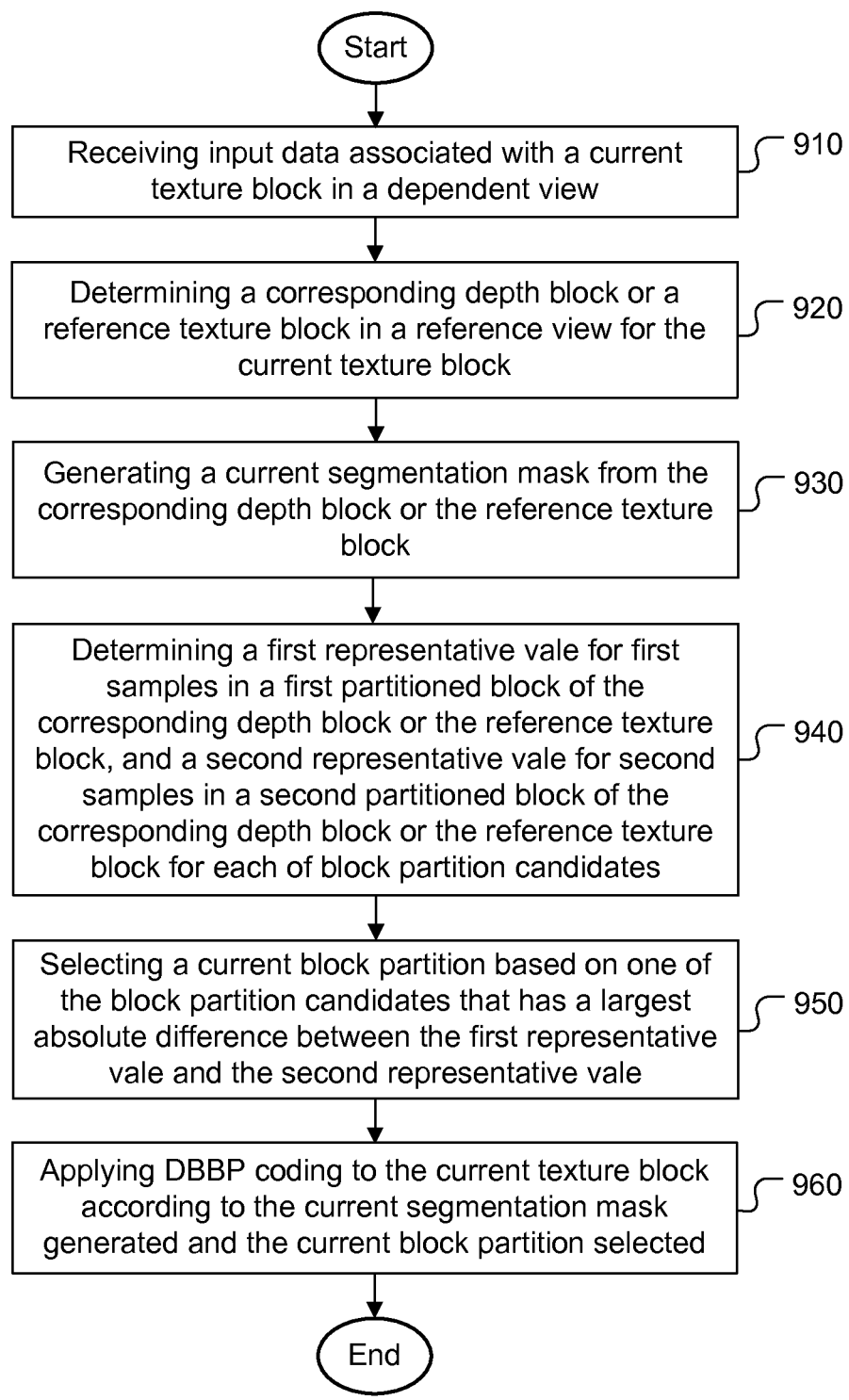
FIG. 9 illustrates a flowchart of an exemplary system incorporating an embodiment of the present invention to simplify depth-based block partitioning (DBBP), where a block partition is selected according to the largest absolute difference between the two sums corresponding to two partitioned blocks of a block partition candidate.

FIG. 9 illustrates a flowchart of an exemplary system incorporating an embodiment of the present invention to simplify depth-based block partitioning (DBBP), where the block partition is selected according to the largest absolute difference between the two sums corresponding to two partitioned blocks. The system receives input data associated with a current block in a dependent view as shown in step 910. A corresponding depth block or a reference texture block in a reference view for the current texture block is determined in step 920. A current segmentation mask is generated from the corresponding depth block or the reference texture block in step 930. A first representative vale for first samples in a first partitioned block of the corresponding depth block or the reference texture block, and a second representative vale for second samples in a second partitioned block of the corresponding depth block or the reference texture block are determined for each of block partition candidates in step 940. A current block partition is selected based on one of the block partition candidates that has a largest absolute difference between the first representative vale and the second representative value in step 950. DBBP coding is then applied to the current texture block according to the current segmentation mask generated and the current block partition selected in step 960.

The flowcharts shown above are intended to illustrate examples of simplified depth-based block partitioning (DBBP) according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of depth-based block partitioning (DBBP) for multi-view video coding or three-dimensional (3D) video coding, the method comprising:
receiving input data associated with a current texture block in a dependent view;
determining a corresponding depth block or a reference texture block in a reference view for the current texture block;
deriving a unified representative value based on the corresponding depth block or the reference texture block;
generating a current segmentation mask from the corresponding depth block or the reference texture block using the unified representative value;
selecting a current block partition from block partition candidates based on the corresponding depth block or the reference texture block and the unified representative value; and
applying DBBP coding to the current texture block according to the current segmentation mask generated and the current block partition selected,
wherein the unified representative value is calculated from partial samples of the corresponding depth block or the reference texture block, and the partial samples correspond to only four corner samples of the corresponding depth block or the reference texture block, and the current texture block corresponds to a coding tree unit (CTU), a coding tree block (CTB), a coding unit (CU), or a prediction unit (PU).

2. The method of claim 1, wherein the unified representative value corresponds to a mean, an average or a sum of all samples or partial samples of the corresponding depth block or the reference texture block.

3. The method of claim 1, wherein said deriving the unified representative value is performed during said generating the current segmentation mask and information regarding the unified representative value is provided to said selecting the current block partition.

4. The method of claim 1, wherein said deriving the unified representative value is performed during said selecting the current block partition and information regarding the unified representative value is provided to said generating the current segmentation mask.

5. The method of claim 1, wherein said selecting the current block partition comprises comparing selected samples at multiple fixed positions of the block partition candidates in the corresponding depth block or the reference texture block.

6. The method of claim 5, wherein the multiple fixed positions correspond to upper-left, upper-right, lower-left and lower-right corner samples of the corresponding depth block or the reference texture block.

7. The method of claim 5, wherein the multiple fixed positions correspond to upper-left, upper-right, lower-left and lower-right corner samples of each partitioned block of each block partition candidate corresponding to the corresponding depth block or the reference texture block.

8. The method of claim 1, wherein the unified representative value is calculated as an average of selected samples corresponding to sub-sampled positions of the corresponding depth block or the reference texture block.

9. The method of claim 8, wherein the unified representative value is calculated for each partitioned block of each block partition candidate corresponding to the corresponding depth block or the reference texture block.

10. The method of claim 1, wherein the unified representative value is calculated from an average of all samples in the corresponding depth block or the reference texture block.

11. The method of claim 1, wherein said selecting the current block partition from block partition candidates comprises determining, for each block partition candidate, absolute difference between a first sum of first samples at first fixed-positions of a first partitioned block and a second sum of second samples at second fixed-positions of a second partitioned block for each block partition candidate, and selecting the block partition candidate having a largest absolute difference from the block partition candidates as the current block partition.

12. The method of claim 1, wherein said selecting the current block partition from block partition candidates comprises determining, for each block partition candidate, absolute difference between a first sum of first samples of a first partitioned block and a second sum of second samples of a second partitioned block for each block partition candidate, and selecting the block partition candidate having a largest absolute difference from the block partition candidates as the current block partition.

13. The method of claim 1, wherein said selecting the current block partition from block partition candidates comprises signaling one or more first flags in a video bitstream to indicate available block partition candidates.

14. The method of claim 13, wherein said selecting the current block partition from block partition candidates comprises signaling one or more second flags in the video bitstream to indicate the block partition candidate selected as the current block partition.

15. The method of claim 13, wherein said selecting the current block partition from block partition candidates comprises signaling one or more second flags in the video bitstream to indicate a partition direction of the block partition candidate selected as the current block partition.

16. The method of claim 1, wherein the block partition candidates exclude AMP (asymmetric motion partitions) when AMP is not available for a current picture, current slice or current coding unit containing the current block.

17. A method of depth-based block partitioning (DBBP) for multi-view video coding or three-dimensional (3D) video coding, the method comprising:

receiving input data associated with a current texture block in a dependent view;

determining a corresponding depth block or a reference texture block in a reference view for the current texture block;

generating a current segmentation mask from the corresponding depth block or the reference texture block using a first representative value of the corresponding depth block or the reference texture block;

selecting a current block partition from block partition candidates based on the corresponding depth block or the reference texture block and a second representative value of the corresponding depth block or the reference texture block; and applying DBBP coding to the current texture block according to the current segmentation mask generated and the current block partition selected; and wherein the first representative value, the second representative value, or both are calculated from partial samples of the corresponding depth block or the reference texture block, wherein the partial samples correspond to only four corner samples of the corresponding depth block or the reference texture block, and the current texture block corresponds to a coding tree unit (CTU), a coding tree block (CTB), a coding unit (CU), or a prediction unit (PU).

18. The method of claim 17, wherein the partial samples correspond to four corner samples of the corresponding depth block or the reference texture block, and the current texture block corresponds to a CTU (coding tree unit), a CTB (coding tree block), a CU (coding unit), or a PU (prediction unit).

19. A method of depth-based block partitioning (DBBP) for multi-view video coding or three-dimensional (3D) video coding, the method comprising:

receiving input data associated with a current texture block in a dependent view;

determining a corresponding depth block or a reference texture block in a reference view for the current texture block;

determining a first representative value from first four corner samples of the corresponding depth block or the reference texture block;

generating a current segmentation mask from the corresponding depth block or the reference texture block using the first representative value;

determining a second representative value for each partitioned block of a block partition candidate corresponding to the corresponding depth block or the reference texture block based on second four corner samples of each partitioned block;

selecting a current block partition from block partition candidates based on the corresponding depth block or the reference texture block and the second representative values associated with the block partition candidates; and applying DBBP coding to the current texture block according to the current segmentation mask generated and the current block partition selected, wherein the first representative value, the second representative value, or both are calculated from partial samples of the corresponding depth block or the reference texture block, and the partial samples correspond to only four corner samples of the corresponding depth block or the reference texture block, and the current texture block corresponds to a coding tree unit (CTU), a coding tree block (CTB), a coding unit (CU), or a prediction unit (PU).

20. A method of depth-based block partitioning (DBBP) for multi-view video coding or three-dimensional (3D) video coding, the method comprising:

receiving input data associated with a current texture block in a dependent view;

determining a corresponding depth block or a reference texture block in a reference view for the current texture block;

generating a current segmentation mask from the corresponding depth block or the reference texture block;

determining a first representative value for first samples in a first partitioned block of the corresponding depth block or the reference texture block for each of block partition candidates, and a second representative value for second samples in a second partitioned block of the corresponding depth block or the reference texture block for each of the block partition candidates;

selecting a current block partition based on one of from the block partition candidates, wherein the selected current block partition that has a largest absolute difference between the first representative value of the current block partition and the second representative value of the current block partition among the block partition candidates; and applying DBBP coding to the current texture block according to the current segmentation mask generated and the current block partition selected, wherein the first representative value, the second representative value, or both are calculated from partial samples of the corresponding depth block or the reference texture block, and the partial samples correspond to only four corner samples of the corresponding depth block or the reference texture block, and the current texture block corresponds to a coding tree unit (CTU), a coding tree block (CTB), a coding unit (CU), or a prediction unit (PU).

21. The method of claim 20, wherein the first representative value and the second representative value are calculated as a sum, an average, a mean, a weighted sum, or a linear combination of the first samples in the first partitioned block and the second samples in the second partitioned block respectively.

* * * * *